(12) United States Patent
Bossert et al.

(10) Patent No.: US 8,056,461 B2
(45) Date of Patent: Nov. 15, 2011

(54) METHODS AND APPARATUS FOR MARINE DEPLOYMENT

(75) Inventors: David E. Bossert, Tucson, AZ (US);
Jeffrey N. Zerbe, Oro Valley, AZ (US);
Ray Sampson, Dartmouth (CA)

(73) Assignee: Raytheon Company, Waltham, MA (US)

(*) Notice: Subject to any disclaimer, the term of this patent is extended or adjusted under 35 U.S.C. 154(b) by 533 days.

(21) Appl. No.: 12/233,254

(22) Filed: Sep. 18, 2008

(65) Prior Publication Data
US 2011/0073707 A1 Mar. 31, 2011

Related U.S. Application Data

(60) Provisional application No. 60/973,328, filed on Sep. 18, 2007.

(51) Int. Cl.
*F41F 3/00* (2006.01)
(52) U.S. Cl. .......... 89/1.809; 89/1.81; 244/63; 114/316; 114/318; 114/319
(58) Field of Classification Search .................. 89/1.809, 89/1.81; 244/63; 114/316, 318, 319
See application file for complete search history.

(56) References Cited

U.S. PATENT DOCUMENTS

| 3,158,062 | A | | 11/1964 | Feiler |
| 3,279,319 | A | | 10/1966 | Semonian et al. |
| 3,499,364 | A | | 3/1970 | D'Ooge |
| 3,716,009 | A | | 2/1973 | Strickland |
| 4,033,225 | A | | 7/1977 | Kartzmark, Jr. |
| 4,566,367 | A | | 1/1986 | Hickey |
| 5,170,005 | A | * | 12/1992 | Mabry et al. .................... 89/1.81 |
| 5,615,847 | A | | 4/1997 | Bourlett |
| 5,646,366 | A | * | 7/1997 | O'Connell .................... 114/21.2 |
| 5,666,900 | A | | 9/1997 | Carroll, III et al. |
| 5,695,153 | A | | 12/1997 | Britton et al. |
| 6,056,237 | A | | 5/2000 | Woodland |
| 6,164,179 | A | | 12/2000 | Buffman |
| 6,286,410 | B1 | | 9/2001 | Liebolt |
| 7,410,124 | B2 | | 8/2008 | Miller et al. |
| 7,448,339 | B2 | * | 11/2008 | Bruengger et al. ........... 114/244 |
| 7,472,866 | B2 | * | 1/2009 | Heaston et al. .................. 244/63 |
| 2002/0170419 | A1 | | 11/2002 | Borgwarth et al. |
| 2008/0111021 | A1 | | 5/2008 | Toth et al. |

FOREIGN PATENT DOCUMENTS

DE 2032126 A1 1/1972
(Continued)

OTHER PUBLICATIONS

International Searching Authority, European Patent Office, "International Search Report," mailed Dec. 4, 2009; International application No. PCT/US2009/057525, filed Sep. 18, 2009.

(Continued)

*Primary Examiner* — J. Woodrow Eldred
(74) *Attorney, Agent, or Firm* — Ingrassia Fisher & Lorenz, P.C.

(57) ABSTRACT

Methods and apparatus for marine deployment according to various aspects of the present invention may operate in conjunction with a floatable housing adapted to be deployed by a marine vehicle. The floatable housing may be adapted to be launched from a marine vehicle and rise to the surface. Assets, such as an unmanned aerial vehicle, may be deployed from the surfaced floatable housing.

18 Claims, 6 Drawing Sheets

FOREIGN PATENT DOCUMENTS

Figure 1:
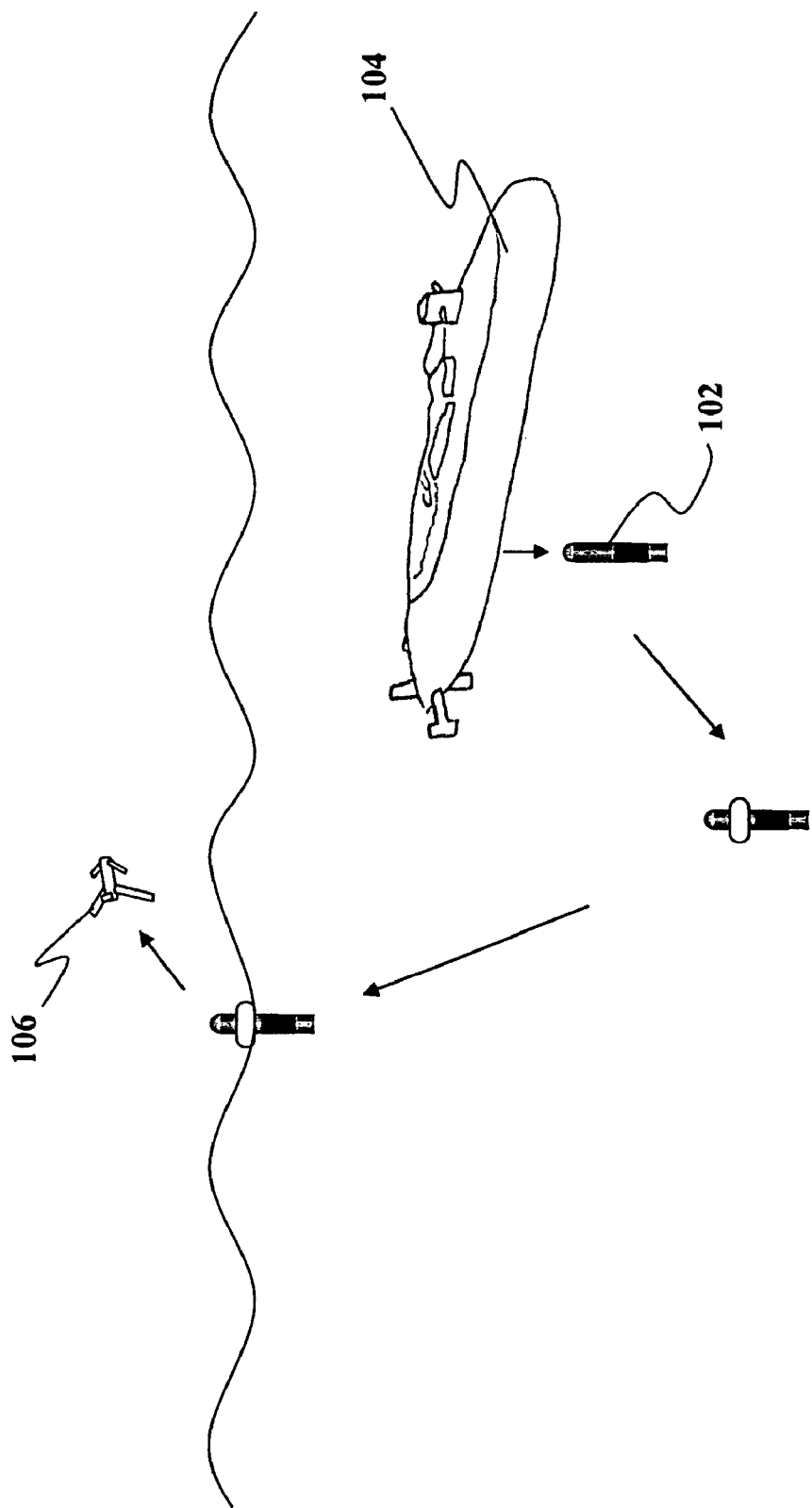

| | | |
|---|---|---|
| GB | 2280251 A | 1/1995 |
| WO | 9639325 | 12/1996 |
| WO | 2008054336 A2 | 5/2008 |

OTHER PUBLICATIONS

Sampson, Ray et al. "Methods and Apparatus for Marine Deployment," U.S. Appl. No. 12/233,328, filed Sep. 18, 2008.

Bossert, David E. et al. "Submersible Transport Canister and Methods for the Use Thereof," U.S. Appl. No. 12/723,294, filed Mar. 12, 2010.

Bossert David E. et al. "Submersible Transport and Launch Canister," U.S. Appl. No. 12/716,731, filed Mar. 3, 2009.

Bossert, David E. et al. "Submersible Transport and Launch Canister and Methods for the Use Thereof," U.S. Appl. No. 12/716,735, filed Mar. 3, 2009.

USPTO Non-Final Office Action mailed Dec. 2, 2009; U.S. Appl. No. 12/233,328, filed Sep. 28, 2008.

USPTO "Final Office Action," mailed May 4, 2010; U.S. Appl. No. 12/233,328, filed Sep. 18, 2008.

International Searching Authority "International Search Report," mailed May 27, 2008, for International Application No. PCT/US2008/076769 filed Sep. 18, 2008.

USPTO Non-Final Office Action mailed Jul. 13, 2010; U.S. Appl. No. 12/233,328, filed Sep. 18, 2008.

Bossert, David E. et al. "Remotely-Triggered Submerged Launch Canisters," U.S. Appl. No. 12/848,449, filed Aug. 2, 2010.

Bossert, David E. et al. "Remotely-Triggered Submerged Launch Canisters and Methods Relating to the Usage and Preparation Thereof," U.S. Appl. No. 12/848,455, filed Aug. 2, 2010.

USPTO Final Office Action mailed Nov. 18, 2010; U.S. Appl. No. 12/233,328, filed Sep. 18, 2008.

Raytheon Company, International Search Report for PCT Application No. PCT/US2011/032698, dated Aug. 3, 2011.

Raytheon Company, International Search Report for PCT Application No. PCT/US2011/032700, dated Aug. 3, 2011.

* cited by examiner

METHODS AND APPARATUS FOR MARINE DEPLOYMENT

CROSS-REFERENCES TO RELATED APPLICATIONS

This application claims the benefit of U.S. Provisional Patent Application No. 60/973,328 filed Sep. 18, 2007, and incorporates the disclosure of the application by reference.

BACKGROUND OF INVENTION

Sea-based assets may be launched in various ways, such as torpedo tubes and missile tubes. Some assets, however, such as unmanned aircraft, are not well-suited to launch via conventional systems. In particular, the use of unmanned aircraft to perform reconnaissance and engagement missions, however, is increasing as the technology matures. Rapid deployment of unmanned aircraft in a variety of situations allows for faster, and often less observable, intelligence gathering. Unmanned aerial vehicles may also be used by ground forces to gather surveillance information on a target prior to engagement with human or other high value assets. Unmanned aircraft and other assets are not limited to ground operations, however, and sea-based launch systems are ill-equipped to deploy them.

SUMMARY OF THE INVENTION

Methods and apparatus for marine deployment according to various aspects of the present invention may operate in conjunction with a floatable housing adapted to be deployed by a marine vehicle. The floatable housing may be adapted to be launched from a marine vehicle and rise to the surface. Assets, such as an unmanned aerial vehicle, may be deployed from the surfaced floatable housing.

BRIEF DESCRIPTION OF THE DRAWING FIGURES

A more complete understanding of the present invention may be derived by referring to the detailed description and claims when considered in connection with the following illustrative figures. In the following figures, like reference numbers refer to similar elements and steps throughout the figures.

Figure 2:
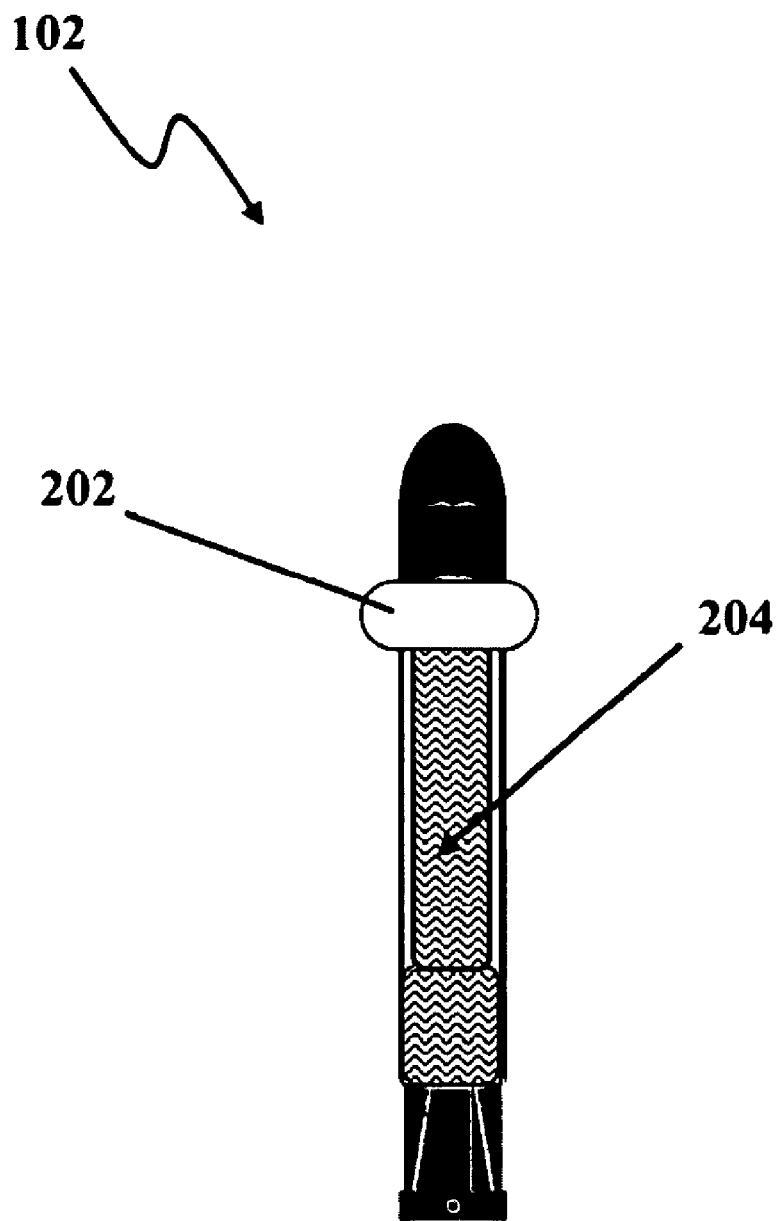
Figure 3:
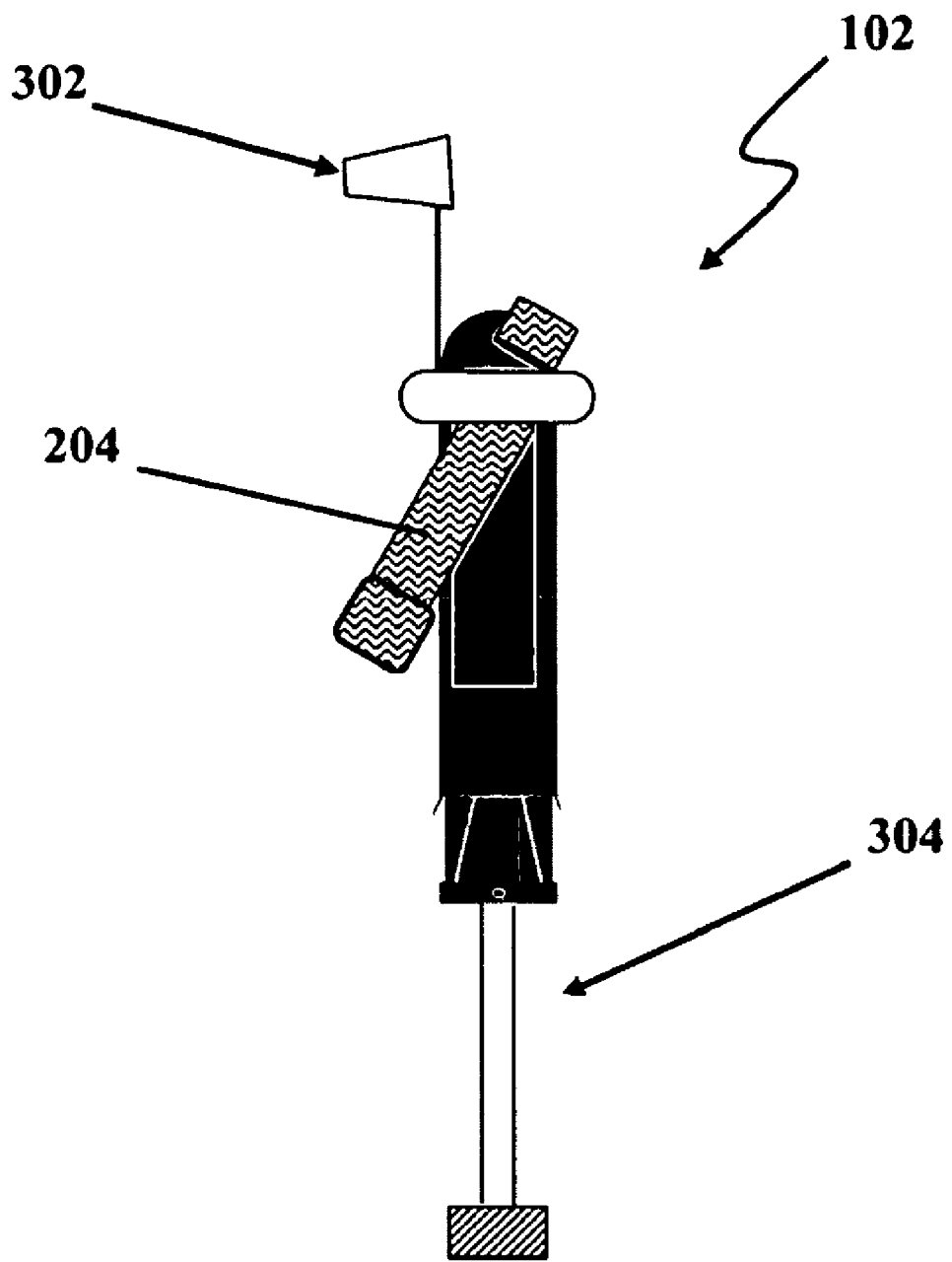
Figure 4:
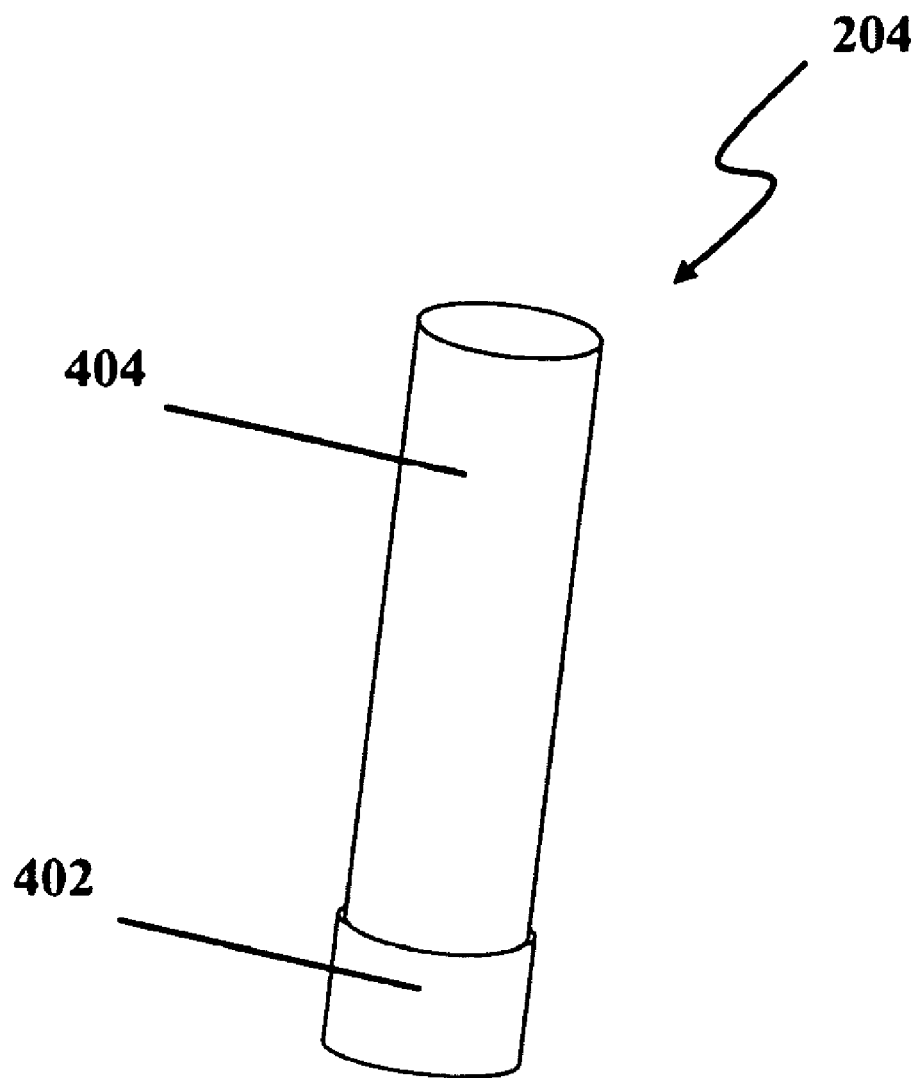
Figure 5:
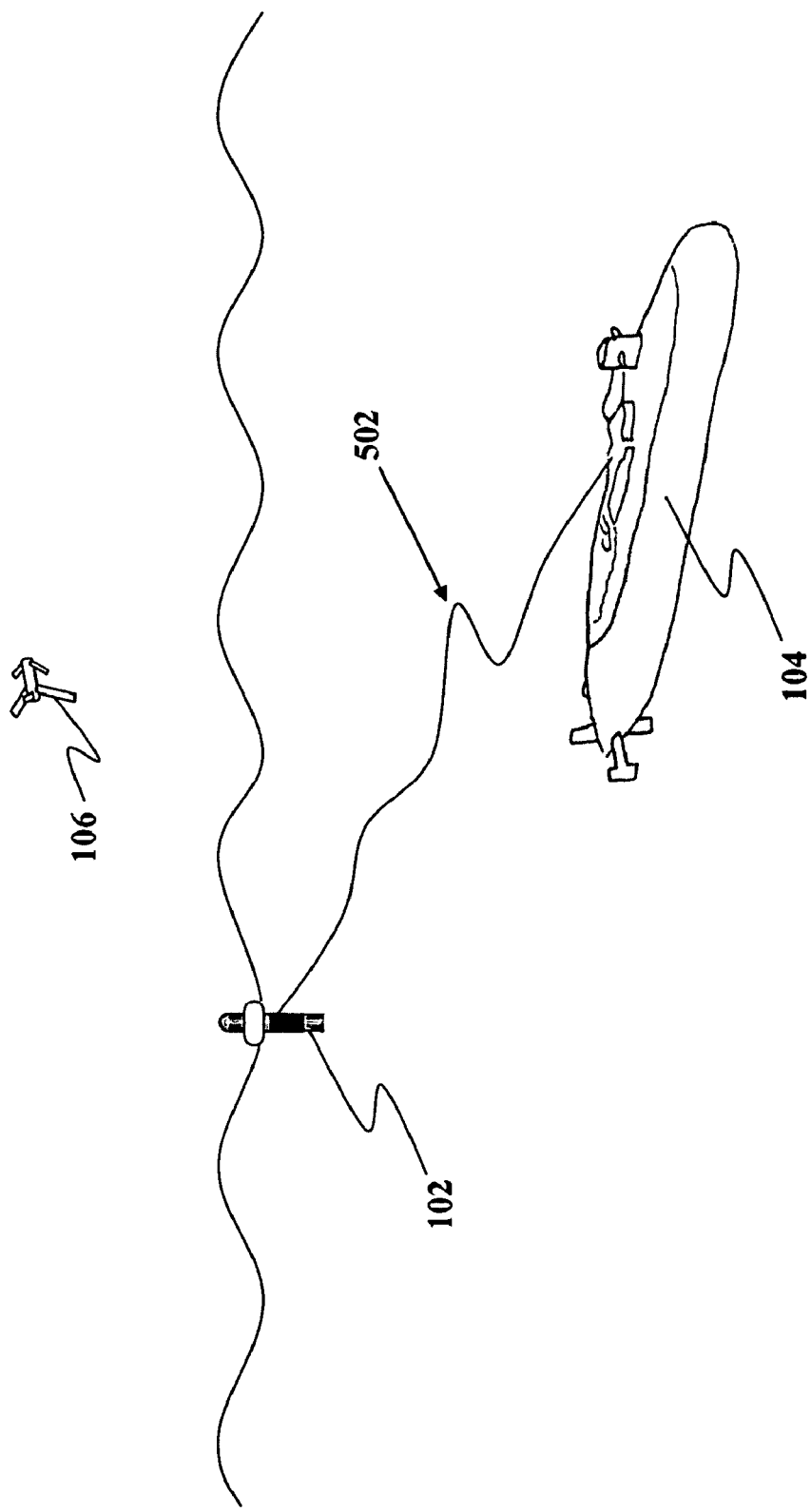
Figure 6:
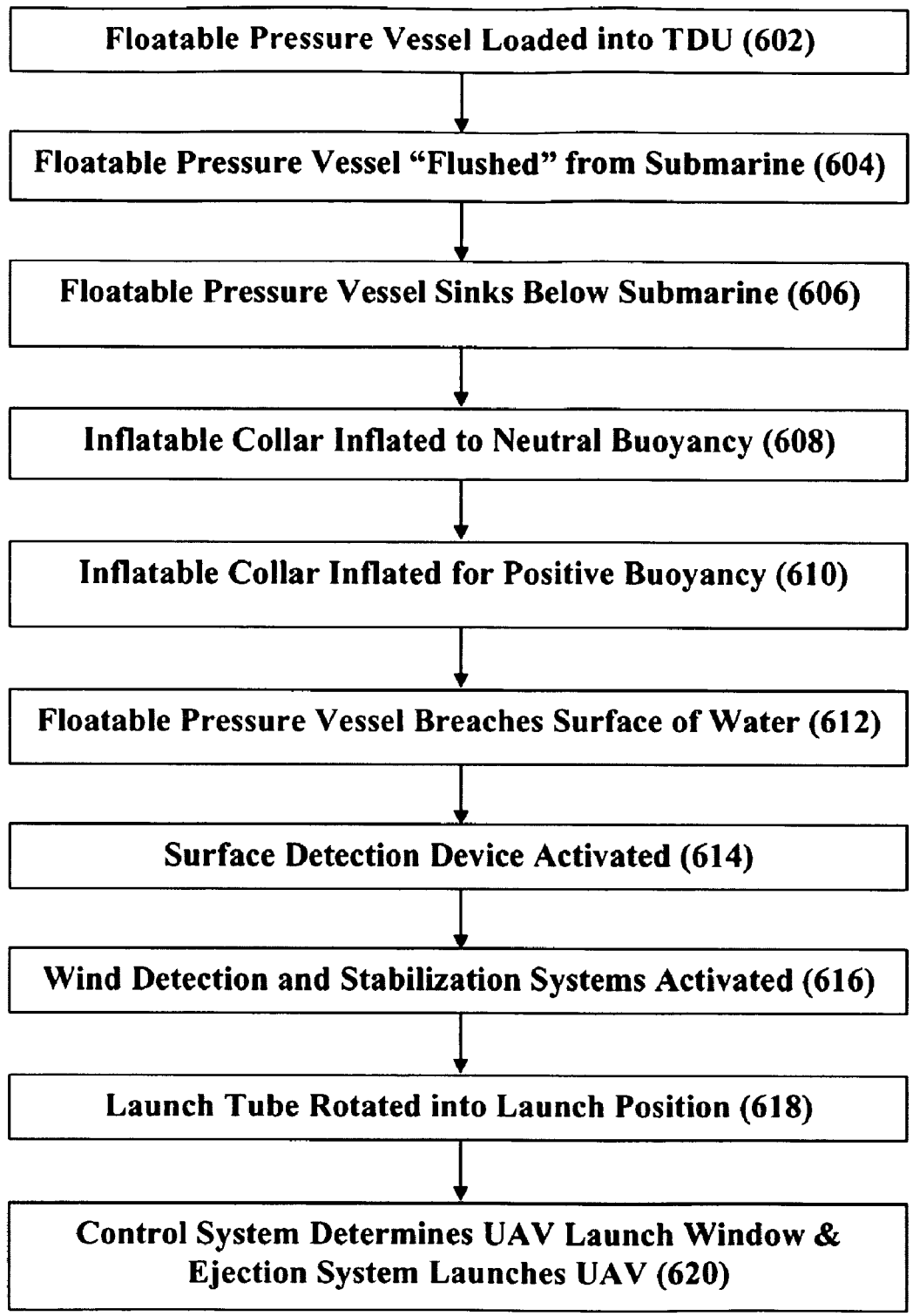

FIG. 1 representatively illustrates an underwater deployment of an unmanned aircraft system launch platform in accordance with an exemplary embodiment of the present invention;

FIG. 2 representatively illustrates a cross-sectional view of a floatable housing;

FIG. 3 representatively illustrates a secondary housing in launch position;

FIG. 4 representatively illustrates a launch tube and UAV ejection system;

FIG. 5 representatively illustrates a communications link between the floatable housing and a submersible vehicle; and FIG. 6 is a flowchart of a launch process.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention may be described in terms of functional elements and various processing steps. Such functional blocks may be realized by any number of hardware or software components configured to perform the specified functions and achieve the various results. For example, the present invention may employ various flotation systems, vessels, communication systems, deployable assets, covers, housings, springs, hatches, and the like, which may carry out a variety of functions. In addition, the present invention may be practiced in conjunction with any number of devices used on or above the surface of a body of water, such as countermeasures, tracking systems, missiles, or rockets, and the system described is merely one exemplary application for the invention. Further, the present invention may employ any number of conventional techniques for deploying underwater devices, deploying aircraft, operating control systems, controlling launch systems, and the like.

Various representative implementations of the present invention may be applied to systems for launching and guiding aircraft. Certain representative implementations may include, for example, systems for launching unmanned aircraft from a marine vehicle. Referring now to FIG. 1, exemplary methods and apparatus for a marine-deployed launch system for unmanned aircraft 106 according to various aspects of the present invention may operate in conjunction with a floatable housing 102 and a marine vehicle 104.

The unmanned aerial vehicle (UAV) 106 comprises an unmanned craft, such as a remotely controlled or an autonomously controlled aircraft. The UAV 106 may comprise any suitable system for operation as a surface launched aircraft. The UAV 106 may also be configured in any suitable manner or size. For example, the UAV 106 may comprise a fixed wing aircraft with electric propulsion to be ejected from the floatable housing 102. Alternatively, the UAV 106 may have a non-electric propulsion system, such as an internal combustion or rocket motor. The UAV 106 may further comprise foldable or extendable control surfaces, for example to facilitate a smaller storage envelope. Alternatively, the UAV 106 may comprise an aircraft with rotatable lifting surfaces, such as a helicopter or an aircraft with a combination of propulsive elements and lifting elements, such as a gyrocopter. In yet another embodiment, the UAV 106 may comprise a micro aerial vehicle with non-traditional propulsion systems.

The UAV 106 may also be configured to withstand forces associated with launch. For example, in one embodiment, accelerations on the UAV 106 during launch may exceed 250 times the force of gravity. In another embodiment, the UAV 106 may be configured to be ejected from the floatable housing 102 with a velocity at or near the stall speed of the UAV 106. For example; in one embodiment, the UAV 106 may be required to successfully transition to flight when ejected at a velocity between one and one-half to two times the stall speed of the UAV 106.

The UAV 106 may be controlled in any appropriate manner, from a remote location or it may be suitably adapted for autonomous operation. In one embodiment, the UAV 106 may be configured for surveillance purposes and transmit information such as real-time video, radar tracking information, or confirm target locations in populated areas. In another embodiment, the UAV 106 may be further configured with a weapon system. For example, the UAV 106 may carry a guided missile or bomb suitably configured to be fired from the UAV 106. In another embodiment, the UAV 106 may be the weapon system itself and be suitably adapted to be flown directly into the target.

While the present embodiment relates to launching the UAV 106, various implementations of the present invention may be adapted to other assets to be launched from the marine vehicle. For example, the UAV 106 may be replaced with sensors, weapons, or even personnel. The assets may be launched into the air, into the water, or may remain aboard the floatable housing 102.

The marine vehicle 104 releases the floatable housing 102 into the water. The marine vehicle 104 may comprise any suitable system for use in a body of water, such as a submarine, bathyscaph, ship or boat, or unmanned submersible vehicle. In the present embodiment, the marine vehicle 104 comprises a submarine with a trash disposal unit (TDU), missile launcher, or torpedo tube. The marine vehicle 104 may also be adapted to communicate with and/or control the UAV 106 after the UAV 106 has been launched.

The floatable housing 102 comprises a container for moving the assets to be deployed to or near the water surface for deployment. The floatable housing 102 may comprise any appropriate container, such as a watertight vessel. In the present exemplary embodiment for launching the UAV 106, the floatable housing 102 provides a floating launch platform for the UAV 106. The floatable housing 102 may at least partially enclose the UAV 106, for example to protect the UAV 106 from water intrusion and/or damage prior to launch. The floatable housing 102 may comprise any system configured to house and launch the UAV 106 from at or near the surface of a body of water, such as a tube, a canister, or a box. The floatable housing 102 may also be configured for placement in the water by various methods, including being dropped into the water from above or released while the marine vehicle 104 is in the water, partially submerged, or completely submerged. In addition, the floatable housing 102 may be adapted for transporting other assets.

The floatable housing 102 may comprise any suitable materials for use in a marine environment, such as metal, plastic, or composite materials. In the present embodiment, the floatable housing 102 comprises stainless steel to resist water intrusion and/or compressive forces associated with deployment at various depths below water.

The floatable housing 102 may also be configured to be integrated into existing marine vehicle 104 ejection systems. For example, the floatable housing 102 may comprise a floatable pressure vessel configured to be released into the water via a TDU aboard a submarine. In another embodiment, the floatable housing 102 may be configured to be ejected via a torpedo tube or missile launch tube. In the present embodiment, the floatable housing 102 is roughly the same size as a standard canister deposited into a TDU aboard a submarine to facilitate launch via the TDU. The floatable housing 102 may be further configured for transport and use by a single person and/or for easy storage aboard the marine vehicle 104.

The floatable housing 102 may also house additional components. For example, referring to FIG. 2, the floatable housing 102 may comprise a secondary housing 204 disposed at least partially within the floatable housing 102 and a flotation system 202. The floatable housing 102 may also comprise a control system to control the operations of the floatable housing 102, as well as orientation and stability systems configured for operation in varied environmental conditions, such as wind and/or rough seas.

The control system controls the operation of the floatable housing 102. The control system may comprise any suitable system for deploying the UAV 106 from the floatable housing 102, and may be disposed within the floatable housing 102 or within the UAV 106. The control system may also be as simple as an electronic circuit assembly or as complex as an integrated computer system with multiple functions. The control system may control operations of various other systems, such as flotation systems 202, orientation systems, stability systems, UAV ejection systems, sensors, hatch release systems, and communications systems.

For example, the control system may comprise a system configured to carry out a specific set of instructions according to a predetermined timing sequence, received instructions, and/or selected conditions. For example, the control system may calculate various environmental conditions and respond in a manner that increases the probability of a successful launch of the UAV 106. In one embodiment, the control system may be adapted to calculate a launch window after determining the direction of a prevailing wind, a wind speed, and the height and frequency of surface waves. This information may then be compared to a set of predetermined criteria to determine if the UAV 106 can be launched at a given point in time. The launch window may be based on reducing the likelihood of launching the UAV 106 into an oncoming wave, into a cross wind, or some other mission dependent variable.

Minimizing the ability to see or detect a launched UAV 106 may increase mission effectiveness. The control system may control the force with which the UAV 106 is ejected from the floatable housing 102. For example, more launch force may be required for successful transition to flight when the prevailing wind speed is low. However, in windy conditions, less ejection force may be required to successfully launch the UAV 106. Controlling the ejection force may also reduce the launch signature or resultant noise of the UAV 106 during launch.

The floatable housing 102 may also comprise sensors, such as depth gauges and/or a surface detection system. The surface detection system may comprise any suitable system for identifying when a portion of the floatable housing 102 nears or breaches the surface of the water. For example, referring to FIG. 1, one end of the floatable housing 102 may be configured to extend Above the surface of the water, allowing the UAV 106 to be launched out of the exposed end. In one embodiment, the surface detection system comprises a salt water completion circuit positioned at or near the end of the floatable housing 102 that extends above the surface of the water. When the end breaches the surface of the water, the circuit opens, generating a signal that is sent to the control system. The signal may initiate any appropriate response, such as a launch sequence or other function. For example, once the surface detection system has made the determination that the floatable housing 102 is floating on the surface of the water, a cover on the floatable housing 102 may be ejected, rotated, or otherwise removed from the floatable housing 102 to expose the end of the floatable housing for launching the UAV 106. In an alternative embodiment, the surface detection system may comprise a depth sensor suitably configured to monitor the rate of change of depth below the surface. Once the rate of change is equal to or approximately equal to zero, the surface detection may provide a signal indicating that the floatable housing 102 has breached the surface of the water.

The flotation system 202 allows the floatable housing 102 to float on the surface of a body of water. The flotation system 202. may comprise any suitable system to provide buoyancy and/or control the buoyancy of the floatable housing 102, such as a buoyant element, an inflatable bag, or extendable structure with positive buoyancy. For example, referring to FIG. 2, the flotation system 202 of the present embodiment comprises an inflatable collar positioned near one end of the floatable housing 102. The inflatable collar may be inflated by any suitable method, such as with compressed or pressurized gas contained within the floatable housing 102. The gas used to inflate the inflatable collar may comprise any suitable gas, such as oxygen, an oxygen/carbon mix, or an inert gas such as helium or argon.

The flotation system 202 may also be selectively engaged, allowing the buoyancy of the inflatable housing 102 to be controlled. For example, referring again to FIG. 1, if the inflatable housing 102 were released from a submerged submarine, the inflatable housing 102 may be configured for negative or neutral buoyancy until the submarine is sufficiently clear of the inflatable housing's 102 path to the surface of the water. Negative buoyancy of the floatable housing 102 may be accomplished by the mass or material of the floatable housing 102 alone, or the floatable housing 102 may further comprise ballast, such as a detachable weight, that may initially cause the floatable housing 102 to sink until the ballast is released.

In the present embodiment, the flotation system 202 may be controlled with a valve system connected to a pressurized gas source and controlled by the control system. The valve system may systematically release the pressurized gas into the flotation system 202 to control buoyancy, or the valve system may be configured to achieve positive buoyancy almost instantly. For example, following release, the floatable housing 102 may not be required to surface immediately but instead hold at a predetermined depth until launch of the UAV 106 is required, such as to provide time for a submarine or other marine vehicle 104 to depart the immediate area or allow for a delayed launch until a selected time. For example, if the amount of time from release of the floatable housing 102 into the water to the launch of the UAV 106 takes ten minutes, it may be desirable to release the floatable housing 102 into the water and allow it to hold at some depth below the surface of the water, allowing for a more rapid launch when needed, such as in response to a remote signal.

The flotation system 202 may further deactivate, such as to allow the floatable housing 102 to sink back into the water. For example, after the launch of the UAV 106 or completion of the UAV 106 mission, the floatable housing 102 may no longer be needed. Therefore, allowing the floatable housing 102 to sink into the water may be desirable. Sinking the floatable housing 102 after launch of the UAV 106 may also obscure the position of the marine vehicle 104.

The floatable housing 102 may include any appropriate contents for deploying the relevant assets or otherwise completing the mission. For example, the floatable housing 102 may contain sensors, air or fuel supplies, launch systems, weapons, or other appropriate cargo. In the present embodiment for deploying the UAV 106, referring to FIGS. 2 and 4, a UAV launch system comprising a secondary housing 204 may be disposed substantially within the floatable housing 102. The secondary housing 204 may include a launch tube 404 for the UAV 106 and a UAV ejection system 404 for launching the UAV 106 down the launch tube 404. The secondary housing 204 may be disposed completely within the floatable housing 102 and/or integrated into the floatable housing 102. For example, the secondary housing 204 may comprise a portion of the end of the floatable housing 102 that extends above the surface of the water.

The secondary housing 204 may be adapted to provide a watertight or semi-watertight seal around the UAV 106. For example, the secondary housing 204 may comprise a pressure vessel configured to resist water intrusion and compressive forces. One end of the secondary housing 204 may also be configured to open prior to launch, exposing the UAV 106 to the ambient air. Alternatively, the secondary housing 204 may comprise essentially a tube with an open end that is exposed when a cover on the end of the floatable housing 102 is removed.

The secondary housing 204 may also be configured to increase the probability of a successful launch of the UAV 106. Referring to FIG. 3, the secondary housing may be configured to rotate independent of the floatable housing 102 to control the angle of attack of the UAV 106 when launched. For example, the floatable housing 102 may be configured to extend above the surface of the water in a substantially vertical orientation. Launching the UAV 106 in this direction, however, may not result in the greatest probability of a successful transition from launch to controllable flight. To increase the probability of successful launch, the secondary housing 204 may be configured to rotate from the vertical orientation towards a more horizontal orientation by a predetermined amount. In the present embodiment, the secondary housing 204 may rotate a selected amount, such as approximately thirty degrees, from the vertical, resulting in a launch direction of sixty degrees above the surface of the water. In another embodiment, the secondary housing 204 may be configured to rotate anywhere between zero and ninety degrees. In a third embodiment, the secondary housing 204 may be configured to selectively rotate to any suitable position given environmental conditions such as wind, wave height, or surrounding obstructions.

Rotation of the secondary housing 204 may be controlled by any suitable method, such as mechanically or pneumatically. In one embodiment, the secondary housing 204 may be held in place with a locking system, such that upon removal of the lock, the secondary housing 204 rotates into position under its own weight. In an alternative embodiment, a spring or other biasing mechanism may be used to rotate the secondary housing 204 into position. In yet another embodiment, the secondary housing 204 may be connected to an electric motor that selectively rotates the secondary housing 204 a specific amount based on various conditions.

The secondary housing 204 may rotate in response to a signal from the surface detection system or from the control system. For example, once the floatable housing 102 breaches the surface of the water, a locking system holding the secondary housing 204 in place may be released in response to a signal from the surface detection system. In another embodiment, the control system may retain the secondary housing 204 in a substantially vertical position until the launch sequence is initiated.

The floatable housing 102 may further comprise additional systems directed at controlling orientation and movement of the floatable housing 102. For example, referring again to FIG. 3, the floatable housing 102 may comprise a wind detection system 302 and a stabilization system 304. The wind detection system 302 detects and repositions the floatable housing 102 according to wind speed and/or direction. The wind detection system 302 may comprise any suitable system for detecting the direction and/or speed of a prevailing wind, such as a wind sock, weathervane, or aerovane. For example, the wind detection system 302 may comprise a wind sock suitably configured to be extended above the top of the floatable housing 102, such as in response to the surface detection system or upon release of a cover from the flotation housing 102 or secondary housing 204. The wind detection system 302 may comprise any suitable material capable of responding to a prevailing wind, such as fabric or a piece of the floatable housing 102 itself.

The wind detection system 302 may also be suitably configured to reposition the floatable housing 102 such that the UAV 106 is launched into the prevailing wind. For example, a wind sock may be extended away from the floatable housing 102 in such a manner that the forces acting on the wind sock tend to move it backwards, resulting in rotating motion applied to the floatable housing 102.

The stabilization system 304 may stabilize the floatable housing 102, such as by countering accelerations of the floatable housing 102 caused by passing waves or currents. The stabilization system 304 may comprise any suitable system for increasing the stability of the floatable housing 102 in various environmental conditions, such as an anchor or drogue. In the present embodiment, the stabilization system 304 comprises an extendable drogue suitably configured to reduce accelerations on the floatable housing 102 caused by waves. Referring to FIG. 3, the drogue is extended downward from an under surface of the floatable housing 102. The drogue may be rigidly attached to the floatable housing 102, tethered to the underside of the floatable housing 102, or otherwise attached to the floatable housing. For example, the drogue may comprise a weight that is extended below the floatable housing 102 by a distance equal to about one-half of the total length of the floatable housing 102.

The stabilization system 304 may further be configured to stabilize the floatable housing 102 if wind results in oscillations or rocking. For example, the floatable housing 102 may be subjected to potentially destructive motion when subjected to high wind speeds or rough seas. In the present embodiment, the stabilization 304 is suitably adapted to stabilize the floatable housing during wind speeds of up to twenty knots and waves of up to eight feet, or the equivalent of a Sea State of 4 on the Pierson-Moskowitz Sea Spectrum. In another embodiment, the stabilization system may configured to maintain stabilization in Sea States greater or less than 4.

The UAV ejection system 402 launches the UAV 106 out of the floatable housing 102. The UAV ejection system 402 may comprise any suitable system for launching a UAV, such as pneumatically, mechanically, or explosively. For example, in a submarine, a non-pyrotechnic launch system may be suitable due to storage and handling conditions. In another embodiment, pyrotechnics may be appropriate to achieve a successful launch. Referring again to FIG. 4, the UAV ejection system 402 may engage the launch tube 404 and utilize a pressurized gas to eject the UAV 106. The pressurized gas may comprise any suitable gas, such as compressed oxygen or nitrogen. Alternatively, the pressurized gas may comprise an inert gas or a mixture of gases that result in a non-explosive compound.

The UAV ejection system 402 may also be configured to reduce the visible or audible signature during launch. For example, some missions may require stealth deployment necessitating the need to deploy the UAV 106 as quietly as possible. Therefore, the ejection system 402, the launch tube 404, and/or the floatable housing 102 may be configured to muffle any sounds that result during launch of the UAV 106.

A communication system may be suitably adapted to transmit and/or receive information with the UAV 106. The communication system may comprise any suitable system for communicating with or controlling the UAV 106. The communication system may be configured as a stand alone system or to integrate with an existing system. For example, referring to FIG. 5, the communication system may comprise a radio frequency (RF) communication transponder located on the floatable housing 102 that is connected to a standard radio frequency interface panel aboard the marine vehicle 104 via a communications tether 502. The communications tether 502 may also be configured to attach to and/or detach from the floatable housing 102 and/or the marine vehicle 104. In another embodiment, the communication system may comprise a RF datalink transmitted through an existing UHF mast antenna installed on the marine vehicle 104. In another embodiment, the communication system may be a combination of a communication tether 502 and an existing communication system.

The communication system may be further configured to allow an operator aboard the marine vehicle 104 to control the launch and/or flight of the UAV 106. Alternatively, the communication system may allow a mission control computer to control the flight of the UAV 106. In another embodiment, the communication system may be used solely to receive a data stream from a surveillance system installed on the UAV 106.

In operation, referring now to FIG. 6, the floatable housing 102 containing the secondary housing 204 and the UAV 106 may be loaded into the ejection system of the marine vehicle 104 (602). At the time of launch, the floatable housing 102 and/or the secondary housing 204 may comprise sealed, pressurized, watertight units. The UAV 106 may be sealed within secondary housing 204, and the secondary housing 204 may be disposed within the floatable housing 102.

The floatable housing 102 is released into the water. The floatable housing 102 may be launched in any appropriate manner, such as via a lock, hatch, torpedo tube, missile tube, external rack, or other suitable mechanism. For example, the floatable housing may be loaded into a trash disposal unit (TDU) aboard a submarine and then "flushed" out into the water, such as at some depth below the surface level (604).

The floatable housing 102 may float to the surface, maintain depth for a period, or initially sink. For example, the floatable housing 102 may initially sink to a lower depth, such as while the submarine moves away from the point where the floatable housing 102 was released (606). This may help prevent the floatable housing 102 from coming into contact with the submarine or provide additional time for the submarine to gain some distance from the floatable housing 102 for security purposes. Alternatively, the floatable housing 102 may hold a substantially the same depth after launch, or may begin to rise to the surface.

In the present embodiment, the floatable housing 102 sinks, such as to a prescribed depth or for a selected period of time, and then begins to ascend. For example, a depth gauge, timer, or remote command may activate the flotation system 202 at a selected time or depth. The flotation system 202 may be configured to provide either neutral or positive buoyancy to the floatable housing 102. Neutral buoyancy may be useful to prevent the floatable housing from sinking to too great a depth while the submarine moves away. Positive buoyancy allows the floatable housing 102 to reduce its depth in the water and eventually breach the surface of the water.

In the present embodiment, the floatable housing 102 is initially negatively buoyant, and activation of the flotation system 202 causes the floatable housing to become neutrally buoyant for a selected time, and then positively buoyant, thus ascending to the surface. For example, after the floatable housing 102 is in the water, the control system may be programmed to allow the floatable housing 102 to sink an additional twenty feet before the flotation system 202 is activated to a neutral buoyancy where the depth below the surface of the water is maintained (608). After five minutes, the flotation system 202 may be activated to achieve positive buoyancy and the floatable housing 102 begins to ascend towards the surface (610). Alternatively, the system may transition directly from negative to positive buoyancy.

The floatable housing 102 floats to the surface to proceed with surface operations, such as to launch the UAV 106 and/or perform other tasks. For example, the floatable housing 102 may float such that a relatively small portion of the floatable housing 102 is exposed above the water surface while the rest remains submerged. In the present embodiment, the floatable housing 102 and flotation system 202 may be configured such that one end of the floatable housing 102 extends above the surface of the water (612).

The floatable housing 102 may also determine whether it has reached the surface, such as to initiate further tasks. In the present embodiment, the surface detection system, such as salt water completion circuit, generates a signal to the control system to indicate that the surface has been reached (614). In response, the control system may initiate additional processes, such as opening the top hatch to expose the UAV ejection system.

The floatable housing 102 may also stabilize the floatable housing 102 in the water, such as by activating the stabilization system 304 (616). For example, upon receiving the signal from the surface detection system, the control system may extend the drogue or other stabilizer to minimize travel and rocking motions induced by waves or wind. The stabilization, however, may be performed at any time, such as upon launch, upon ascent, or not at all.

The wind detection system 302 may also detect the wind direction and/or speed and orient the floatable housing 102 accordingly (616). For example, the floatable housing 102 may extend the wind sock or vane. The drag of the wind on the wind sock or vane tends to rotate the floatable housing 102 such that the wind sock or vane is downwind. Thus, the UAV 106 may be launched directly into the oncoming wind.

The surface operations may then be completed, such as launching the UAV 106. In the present embodiment, after the floatable housing 102 is properly oriented and stable, the secondary housing 204 may be rotated relative to the floatable housing 102 to some degree between purely vertical and purely horizontal (618). The secondary housing 204 is rotated so that the UAV 106 is launched at an angle of attack that increases the likelihood of a successful launch. The angle of rotation may be controlled by the control system or it may be set at a predetermined value.

The UAV ejection system 402 may then be activated to launch the UAV 106, such as within a selected launch window (620). In the present embodiment, the compressed gas is suddenly released against the aft portion of the UAV 106 to drive the UAV 106 out of the launch tube 404. Any appropriate mechanism, however, may launch the UAV 106, such as rockets, explosives, or catapults.

In addition, communications may be established between the marine vehicle 104, the UAV 106, the floatable housing 102, and/or other suitable element such as deployed troops in the field and/or remote weapon systems. In the present embodiment, the UAV 106 communicates with the marine vehicle 104, such as to control the UAV 106 and/or send data from the UAV to the marine vehicle 104. The UAV may communicate directly with the marine vehicle, such as via RF communications, or the UAV 106 may communicate with the marine vehicle 104 via the floatable housing, such as over a radio frequency transponder on the floatable housing connected to the marine vehicle 104 via a communications tether 502.

Upon completion of surface activities, the floatable housing 102 may remain in position, return to the marine vehicle 104 for reuse, or sink. For example, after launch of the UAV 106, the flotation system 202 may be deactivated, such as by deflating the collar. The floatable housing 102 may then sink to the bottom. Alternatively, the floatable housing 102 may remain on the surface for a selected period of time, such as to facilitate communications.

In the foregoing specification, the invention has been described with reference to specific exemplary embodiments. Various modifications and changes may be made, however, without departing from the scope of the present invention as set forth in the claims. The specification and figures, are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation as used in this description are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. An underwater method of deploying an unmanned aerial vehicle, comprising:
    releasing a floatable canister from a submerged surface of a marine vehicle, wherein a launch tube is further disposed within the floatable canister and is configured to house the unmanned aerial vehicle;
    allowing the floatable canister to controllably rise to the surface of the water;
    detecting the direction of a prevailing wind and orienting the floatable canister such that the unmanned aerial vehicle has a predetermined heading with respect to the prevailing wind and
    launching the unmanned aerial vehicle out of the launch tube with an ejection system configured to engage the launch tube.

2. A method of deploying an unmanned aerial vehicle according to claim 1, wherein the floatable canister further comprises a flotation device configured to selectively control the buoyancy of the floatable canister.

3. A method of deploying an unmanned aerial vehicle according to claim 1, further comprising rotating the launch tube to a non-vertical position prior to launch.

4. A method of deploying an unmanned aerial vehicle according to claim 1, further comprising:
orienting the floatable canister such that the unmanned aerial vehicle is launched directly into the prevailing wind;
monitoring an environmental condition; and
determining an optimum launch window according to the environmental condition and a set of predetermined launch criteria.

5. A method of deploying an unmanned aerial vehicle according to claim 1, further comprising extending a drogue from the floatable canister.

6. A method of deploying an unmanned aerial vehicle according to claim 1, further comprising establishing a communicative link between the marine vehicle and the unmanned aerial vehicle.

7. A method of deploying an unmanned aerial vehicle according to claim 6, wherein the communicative link comprises:
a radio frequency transponder connected to the floatable canister, wherein the transponder is adapted to communicate with the unmanned aerial vehicle; and
a communication tether connecting the radio frequency transponder to the marine vehicle.

8. A method of deploying an unmanned aerial vehicle according to claim 6, wherein the communicative link comprises an UHF antenna connected to the marine vehicle.

9. A method of deploying an unmanned aerial vehicle according to claim 1, further comprising sinking the floatable canister after the unmanned aerial vehicle is launched.

10. A method of deploying an asset underwater from a marine vehicle, comprising:
launching a container containing the asset into the water from the marine vehicle;
floating the container to the surface;
detecting the direction of a prevailing wind and orienting the container such that the asset has a predetermined heading with respect to the prevailing wind; and
deploying the asset from within the container after arriving at the surface.

11. A method of deploying an asset according to claim 10, wherein launching the container comprises releasing the container via a trash disposal unit of the marine vehicle.

12. A method of deploying an asset according to claim 10, wherein floating the container to the surface comprises:
initially maintaining at least one of a negative buoyancy and a substantially neutral buoyancy for the container; and
developing a positive buoyancy for the container.

13. A method of deploying an asset according to claim 10, wherein deploying the asset comprises launching an unmanned aerial vehicle (UAV) from the container.

14. A method of deploying an asset according to claim 13, wherein launching the UAV comprises:
orienting a launch tube into a non-vertical position; and
launching the UAV through the launch tube.

15. A method of deploying an unmanned aerial vehicle (UAV) from an underwater vehicle, comprising:
launching a container containing the UAV from the underwater vehicle;
activating a flotation system coupled to the container;
floating the container to the surface, wherein one end of the container protrudes from the surface of the water;
detecting the direction of a prevailing wind and orienting the container such that the UAV has a predetermined heading with respect to the prevailing wind;
exposing the UAV via the protruding end of the container; and
launching the UAV from the container.

16. A method of deploying a UAV according to claim 15, wherein launching the container comprises releasing the container via a trash disposal unit of the marine vehicle.

17. A method of deploying a UAV according to claim 15, wherein activating the flotation system comprises:
initially maintaining at least one of a negative buoyancy and a substantially neutral
buoyancy for the container; and
developing a positive buoyancy for the container.

18. A method of deploying a UAV according to claim 15, wherein launching the UAV comprises:
orienting a launch tube into a non-vertical position; and
launching the UAV through the launch tube.

* * * * *